Dec. 28, 1948.  M. R. WOLFARD  2,457,425
STABILIZING DEVICES FOR RESILIENT STRUCTURES
Filed June 23, 1944  5 Sheets-Sheet 1
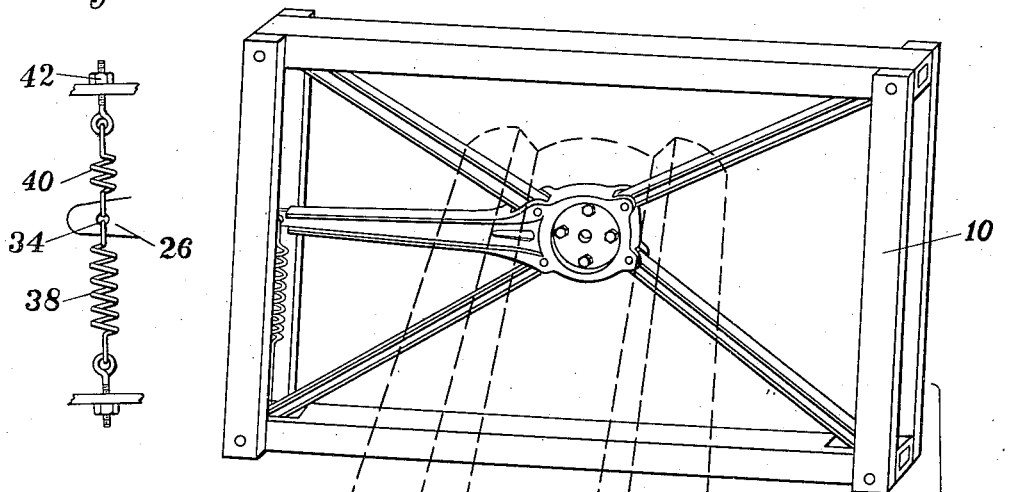
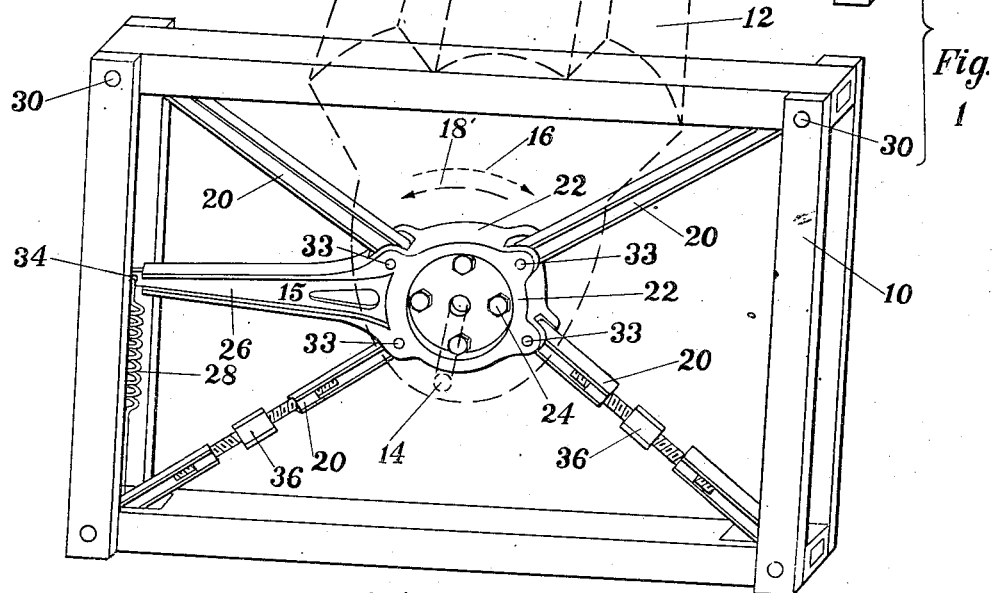
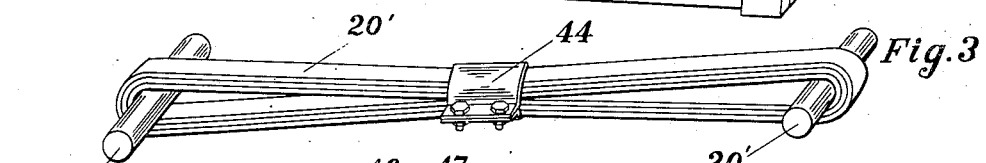
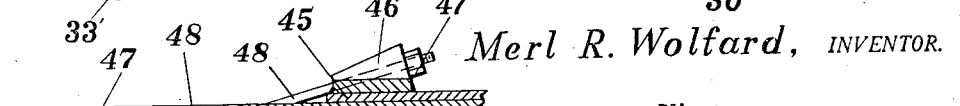
Merl R. Wolfard, INVENTOR.
BY
Everett E. Kent
ATTORNEY.

Dec. 28, 1948. M. R. WOLFARD 2,457,425
STABILIZING DEVICES FOR RESILIENT STRUCTURES
Filed June 23, 1944 5 Sheets-Sheet 2
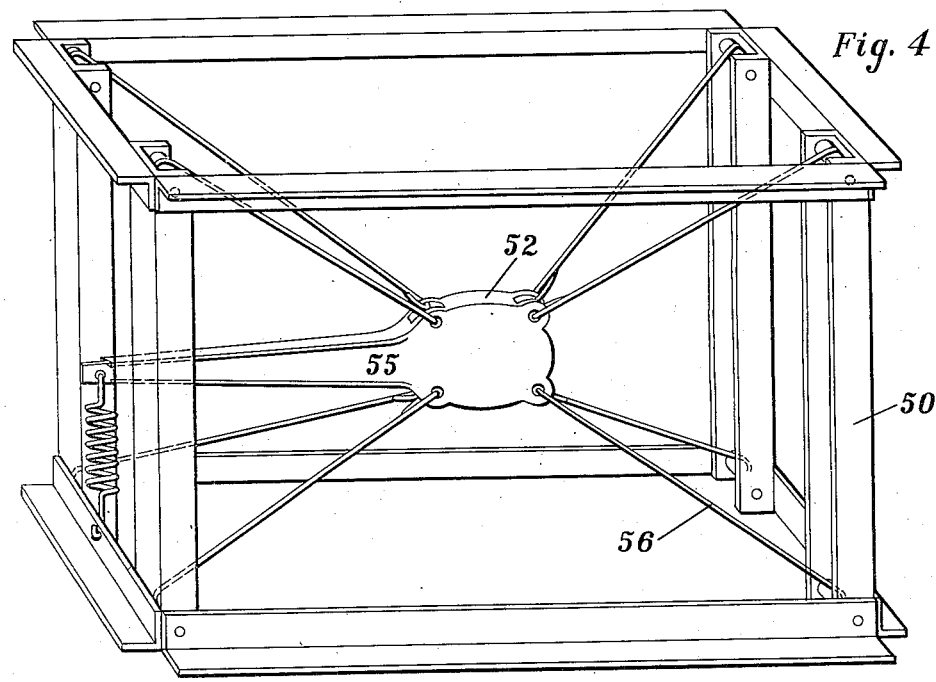
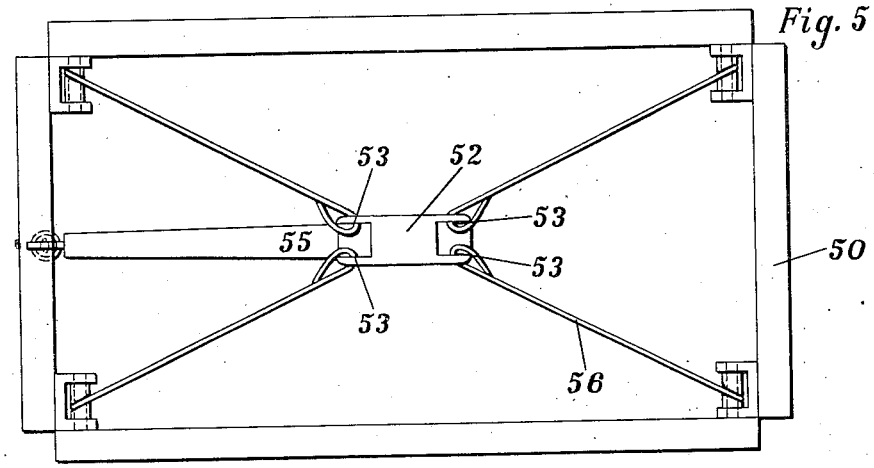
Merl R. Wolfard INVENTOR.
BY
Everett E. Kent ATTORNEY

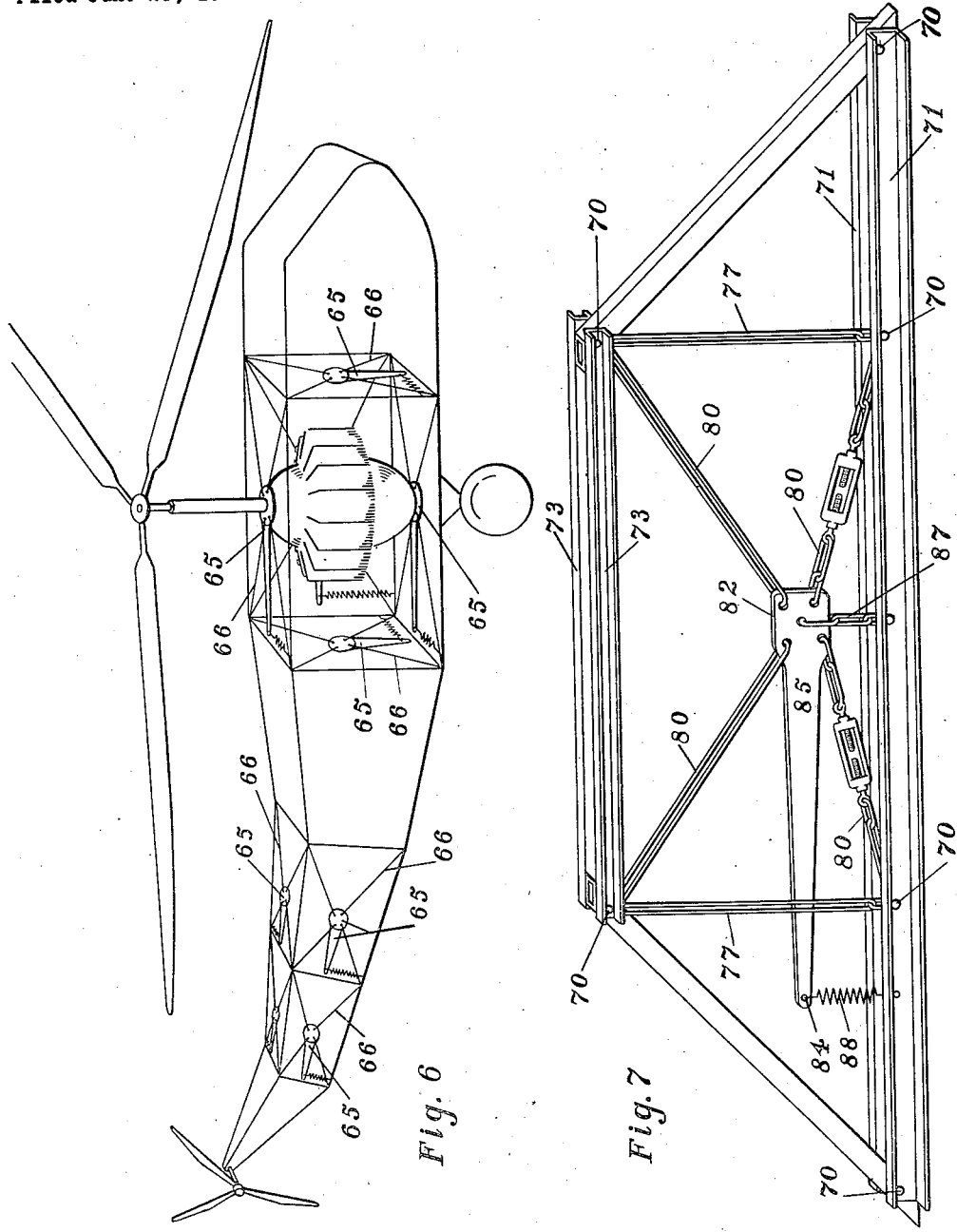

Dec. 28, 1948. M. R. WOLFARD 2,457,425
STABILIZING DEVICES FOR RESILIENT STRUCTURES
Filed June 23, 1944 5 Sheets-Sheet 4
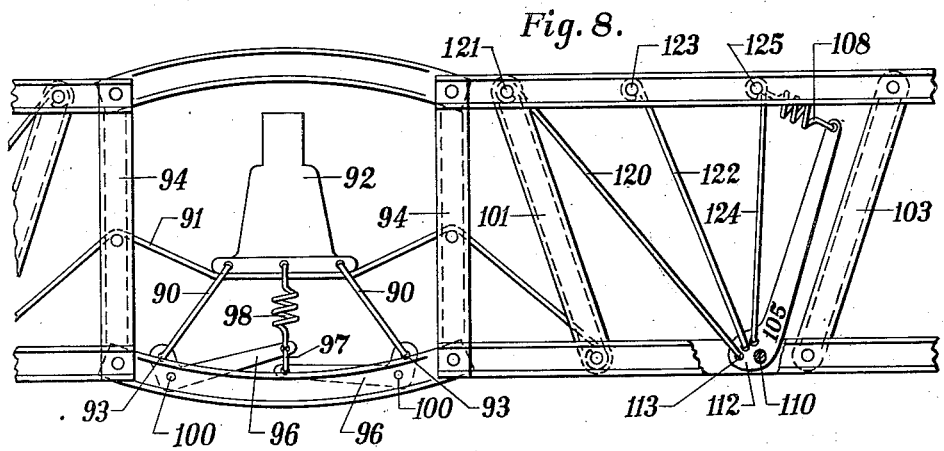
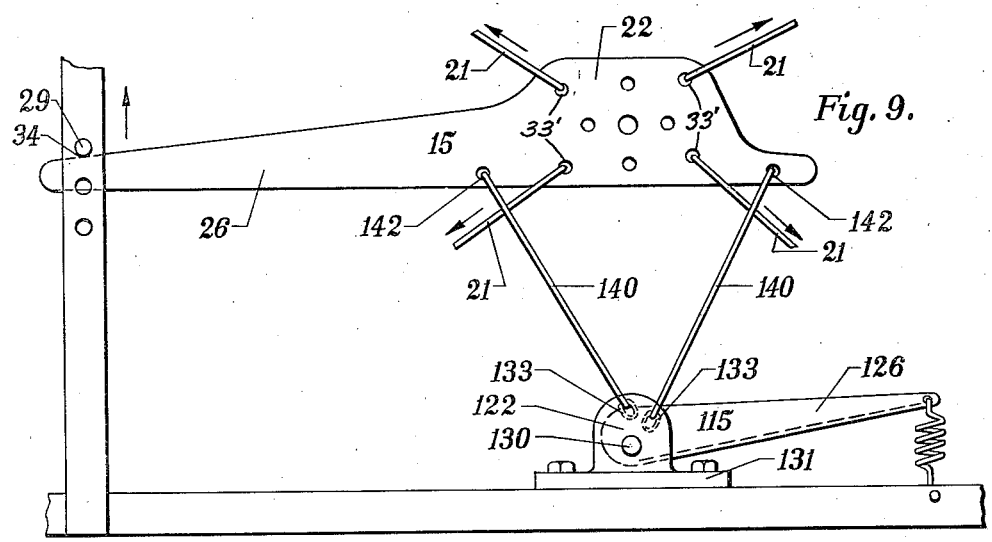
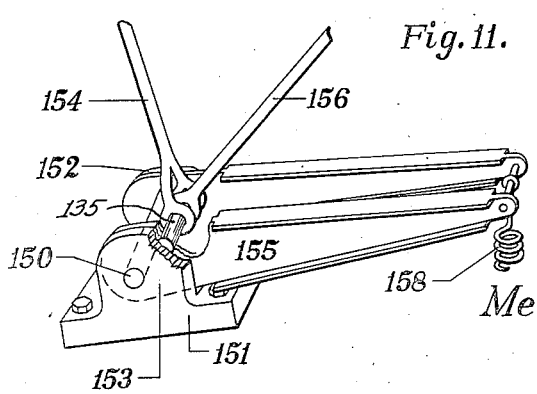
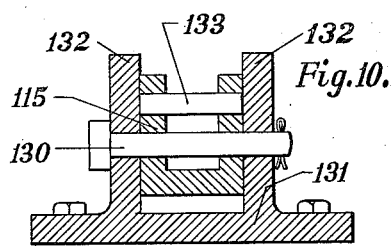
Merl R. Wolfard, INVENTOR.
BY Everett E. Kent ATTORNEY.

Dec. 28, 1948.                M. R. WOLFARD                 2,457,425
                STABILIZING DEVICES FOR RESILIENT STRUCTURES
Filed June 23, 1944                              5 Sheets-Sheet 5

Merl R. Wolfard  Inventor

By  Everett E. Kent

Attorney

Patented Dec. 28, 1948

2,457,425

UNITED STATES PATENT OFFICE 2,457,425

STABILIZING DEVICE FOR RESILIENT STRUCTURES

Merl R. Wolfard, Cambridge, Mass.

Application June 23, 1944, Serial No. 541,828

9 Claims. (Cl. 248—20)

1

This invention relates to stabilizing devices for resilient structures.

In general the invention provides a leverage means combined with a group of stabilizing ties, for impeding and arresting vibratory movements in a load-carrying resilient structure which is subject to disturbing forces that tend to make it vibrate.

For example, in aircraft, disturbing forces include the engine, the propeller, and the changing velocity of air currents. In structures of many kinds vibrations result from the impetus of intermittent forces, such as variations of torque in many sorts of machines. The invention provides means to neutralize such tendencies to vibration. Assuming, of course, that the structure is of substantial dimensions, the invention provides means for impeding and arresting those undulatory movements that ordinarily result from the elastic yielding and the ensuing resilience of parts of the structure. Cumulative amplitudes of movement, which result from elastic yielding and elastic return movements acting in step with each other, or at least in harmonic sequence with each other, are restricted so effectively that they are substantially prevented.

I believe that the invention accomplishes its minimizing of vibratory movements, in large measure, by throwing out of step these two movements, elastic yielding and elastic return (resilience), or at least by eliminating harmonic sequences of these two movements. The term "resilience" is used throughout this specification to designate this elastic return.

Devices of the invention may be incorporated at the places where agitating forces act to initiate vibratory movements, or can be placed so as to impede movements which elastic yielding and resilience of the structure tend to propagate.

The invention provides leverage means combined and coacting with a group of stabilizing ties, arranged so that a loading, which the ties have in common when the structure is static, migrates from one to another stabilizing tie, when the structure is subjected to a disturbing force. The leverage means comprises a bar lever having at least one long arm and preferably two or more short arms, the long arm being relatively much longer, preferably many times longer, than the short arm. From each short arm a stabilizing tie runs to a single certain region of the structure, which is to be stabilized, and imposes thereon its share of the loading which the long arm imposes in common on the totality of the short arms, when the structure is static. Means is

2 provided for continually applying force to the long arm of the lever for providing a loading which constitutes a load that is common to the several short arms. The distribution through the short arms to the several ties is such that each several tie is stressed, when the structure is static. If a said certain region moves so as to relax its stabilizing tie, the stress dropped by that tie is picked up by those other stabilizing ties of the group, which continues collectively to support the full loading which the ties carry in common. Thus the stress released from one stabilizing tie becomes additional stress in one or more other of the ties of the group, so that, when there is this increase of stress in such another tie, movement of the region to which that tie is connected is rtestrained. Also, if a disturbing force should tend to move a certain tied region of the structure so as to increase the stress that is in the stabilizing tie of that region, such movement is impeded by that tie, which picks up loading that was being carried by other ties. Thus a relatively light continual force applied to the long arm of the lever provides a powerful restricting force which is continually available to minimize movement of which ever region tends to move so as to increase the stress in its respective tie. Thus the invention impedes and arrests, i. e., minimizes, vibratory movements.

These said certain regions are selected at locations which are at a distance from each other and which are so related to each other in the resilient structure that they are regions which, when a dynamic disturbance occurs, tend to stress one stabilizing tie and to relax another. For example, the corners of a panel of a load-carrying structure are such regions, when these corners are connected by diagonal stabilizing ties.

When a disturbing force tends to distort such a panel one diagonal becomes relaxed and the other diagonal's share of the common loading becomes augmented and stresses that diagonal further. The invention arranges for migration of part or all of the common loading, so that it constitutes an immediate application of force for impeding movements at their inception. This can be made to function so precisely and so instantaneously, in response to a disturbing force, that it impedes movements which are only microscopic in magnitude. This impeding of movements at their inception, and the ensuing rapid arresting of them, act to destroy harmonic sequences between the elastic yielding and the elastic return movements within a resilient structure.

As heretofore built, in so far as I am aware resilient load-carrying structures have had no such impediment, in which a single powerful force is pre-distributed to different regions of the structure, and each distributed part of that force stands ready by migration of loading to provide such an impediment. The only comparable force, if any, has been the slight damping effect or energy absorption by the materials of construction of the structure itself, while passing through a complete cycle of elastic yielding and elastic return. The materials of construction used today are practically elastic; therefore a repetitive sequence of agitating impulses, such as the variations of torque from a machine, can build up a reservoir of resilience within the carrying structure, so that very large amplitudes of movement may occur. The means of avoidance heretofore has been to make the carrying structure massive, i. e., very heavy and rigid.

Devices of the invention repeatedly brake, i. e. impede, disturbing forces which otherwise would become a progressive sequence of vibrating movements of increasing amplitude, such as may be caused by the beats of an engine, or by gusts of wind in rhythmic sequence.

A compact form of a leverage means suitable for many uses is a duplex lever having a long arm and a laterally extended hub portion in which hub portion there is a plurality of pivotal points which are at short distances from each other for constituting short arms of the lever. From each of these pivotal points a stabilizing tie extends to a respective region of the resilient structure, as defined above, and the distance from a pivotal point to the projected line of a tie connected to another pivotal point is an effective short arm of the lever.

For stabilizing a rectangular or other frame this hub may be located in the field enclosed by the frame, with each stabilizing tie extending respectively from a pivotal point in the hub to a corner of that frame. A continual force may be applied to the long arm of the lever, as by a spring, or by forcing the long arm to a held location relative to the frame, so that, when the structure is static, there is stress in each of the said ties.

The long arm of this duplex lever should be much longer than any one of its effective short arms which apply stresses to the stabilizing ties, preferably five, ten, twenty or more times the effective length of a short arm. This provides a desynchronized element in which it is practically impossible for any sequence of live loadings to cause such an element to vibrate in harmony with the dominant vibrating periods of the resilient structure which is being stabilized.

Since this lever preferably has only one long arm, the point of application of force to that long arm should be remote from the hub of the lever. The having of length in this long arm is important for several structural reasons. First, the application of force to the long arm should be remote from the hub so that the magnitude of this force applied to it can be small relative to the stress applied to the several stabilizing ties. Second, this locates the reaction of this force within the frame at a distance from the hub; therefore the intensity of its reaction on the frame is not great. Third, the necessary stabilizing stress in the several ties is an assignable quantity for stabilizing purposes; but, when, as herein provided, the fulcrum of the lever is also carried by the group of stabilizing ties, the primary fulcrum reaction will be larger if the point of application of the loading force on the long arm of the lever is nearer the hub, and, conversely, the force for supporting the fulcrum is less if the length of the long arm is greater. Therefore, as the totality of stabilizing ties must support this fulcrum reaction, the greater the length of the long arm, the lighter is the weight to be carried by the stabilizing ties, and the smaller these ties may be.

An outstanding utility of such a duplex lever is herein shown by illustrating a way in which it can be applied for restricting oscillating and vibrating movements which engines, and other power developing and power operated machines, tend to produce. In the present illustration the duplex lever is placed at each end of the engine or the machine, and the engine casing is fastened to the hubs of these two levers, whereby the oscillating and vibrating movements which result primarily from the variations of torque during the operating of such machines, are minimized.

When these variations of torque are extreme the invention provides for an opposed spring, set with a slight tension by the loading spring which continually applies force to the long arm of the lever, so as to apply tension to all of the stabilizing ties when the structure is static.

Other features and advantages of this invention will be more fully set forth with reference to the accompanying drawing.

In the accompanying drawings, which are diagrammatic—

Figure 1 is a perspective view of an embodiment of the invention, in the style which embodies a duplex lever for stabilizing two frames that support an aircraft engine between them, the outline of the engine being dotted;

Figure 2 is a detail showing opposed springs for loading and positioning the long arm of a duplex lever;

Figure 3 is a perspective of a preferred construction of a tie;

Figure 3a is a side elevation, partly in section, of a fragment of one limb of the link of Figure 3, illustrating a means of holding together the ends of the ribbon which are respectively the outer and the inner laminae of the link;

Figures 4 and 5 are a perspective and a plan showing a duplex lever arranged for stabilizing a structure in which the lever is not in the plane of any panel of the structure;

Figure 6 is a perspective representation of a helicopter in which the stabilizing invention is embodied in various panels of the structure;

Figure 7 is a perspective of a bridge truss, stabilizing by a group of ties stressed by a duplex lever;

Figure 12:
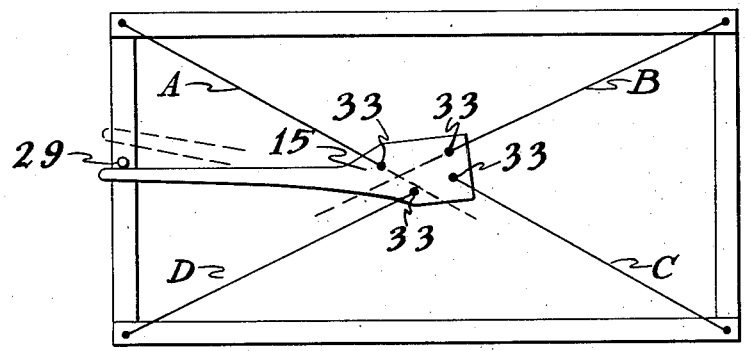
Figure 13:
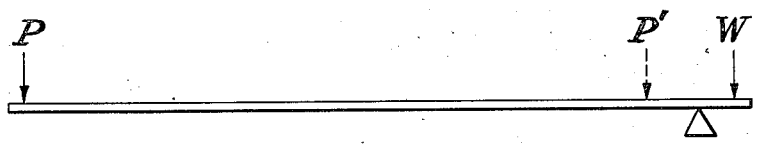
Figure 14:
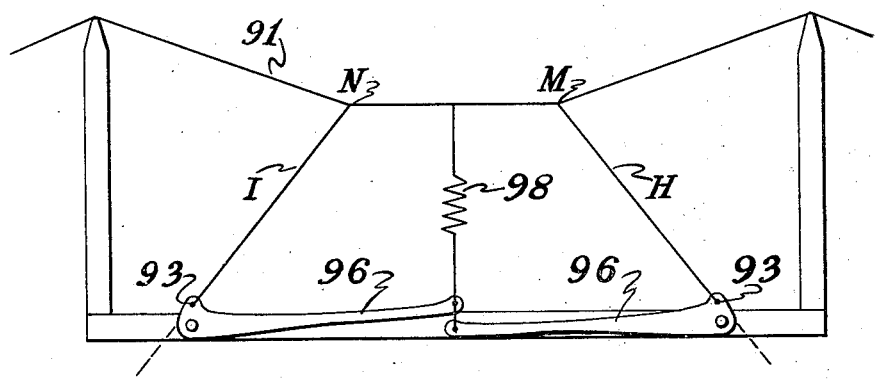

Figure 8 is a front elevation of a portion of an airplane frame, in which the struts are pivoted to the upper and lower horizontal members of the frame; showing at the left an aircraft engine supported by suspension, and an adaptation of the invention to stabilize that engine; and showing at the right an adaptation of the invention for stabilizing a frame panel which is longer at the top than at the bottom;

Figure 9 is a side view of a duplex lever and a portion of the group of ties tensioned thereby, showing also an auxiliary duplex lever having a fixed fulcrum whose two stabilizing ties are connected to the first duplex lever at each side of the hub of that lever;

Figure 10 is a section through a simple mounting that may be used for a duplex lever having a fixed fulcrum;

Figure 11 is a perspective of a lever in which the two stabilizing ties of the group extend in different directions from a single pin, different points on whose surface constitute separate pivotal points, one for each tie;

Figure 12 is a diagram representing in side elevation the mounting of a duplex lever showing locations of pivotal points in the hub and the relation of the length of the long arm to the respective lengths of the short arms;

Figure 13 is a diagram of a simple lever illustrating that the magnitude of the total reaction on the fulcrum is greater if the load is applied to the long arm at a location nearer the fulcrum, and is less if it is at a distance; and Figure 14 is a diagram in the nature of a side elevation, for showing two yieldable points at which a machine may be partially supported, and the ties and leverage means for stabilizing those two points.

This figure may be considered to be a diagrammatic representation of the left hand portion of Figure 8.

Figure 1 shows two rectangular frames 10, 10, for supporting the two ends of an aircraft engine casing whose outline 12 appears in dash lines. The engine rotates the shaft 14 clockwise, as indicated by the arrow 16 of short dots, which makes an anti-clockwise torque reaction of the casing 12, as indicated by the dash line arrow 18. This reaction is imposed on the supports of the engine, whatever their style may be, here represented by the two simple rectangular frames 10 which are assumed to be parts of the frame of the aircraft. The invention is embodied in the connections of the engine to these frames. Each frame has a group of stabilizing ties 20, in which each tie extends to it from a pivotal point in the hub 22 of a duplex lever 15. The hub is bolted, as at 24, to one end of the engine casing 12. The lever as a whole will be referred to by the numeral 15. The long arm 26 of the lever continually has force applied to it by any suitable means, in this instance by a spring 28 which applies force tending to rotate the lever 15 in the same direction 18 as the engine reaction tends to rotate it. This applied force constitutes a loading which stresses all of the ties in common, when the structure is static.

The frame 10 may be of any suitable structural type appropriate to its function in the apparatus of which it is a part, but Figure 1 illustrates one particular merit, which the invention makes possible, in that it shows the elements of the frame joined only by pivots 30 at the corner angles of the frame, instead of by rigid corner connections such as are customary. The stabilizing ties 20 hold this frame in suitable position.

Each of the four corner pivots 30 of the frame is connected by a tie 20 to one of several pivotal points 33 in the hub 22, which is located within the field enclosed by the frame.

The duplex lever of Figure 1 has a long arm 26 and four pivotal points 33 in its hub 22, from which stabilizing ties 20 extend severally to the four corners of the frame. These long and short arms and their relationships to each other, as seen in Figure 1, are more fully identified by referring to the diagram Figure 12 and its description. The spring 28 applies at the location 34 a continual force to the long arm 26 of the lever, producing a tendency to rotate the hub, and this tendency is resisted in part by each of the four ties 20 whose totality of resistance balances the tendency to rotation caused by the loading at 34.

The loading of the long arm when the structure is static may be accomplished in any suitable way. The spring 28 applies to the long arm a continual force which puts that arm at the position indicated by the reference numeral 34, when the structure is static. Without using a spring 28, the long arm may be forced to that position and then held there, as by a stop, seen at 29 in Figure 9. Any suitable means, as turn-buckles 36, may be provided for setting the length of the ties 20.

The resulting condition is that with the engine rotating in the clock-wise direction of Figure 1 (dotted arrow 16), the reaction torque of the engine casing is anti-clock-wise (dash arrow 18), that is, the primary reaction which is to be impeded and arrested is in the direction which tends to move the long arm of the lever away from its stop—and this is in the direction that would tighten each of the ties. It follows that the reaction torque may be resisted at each corner of the rectangular frame.

No distortion can occur without lengthening one or another of the diagonal tying means. Each of these diagonal tying means includes a work arm of the lever, i. e., a short arm. The short arm, in whichever diagonal receives stress whenever there is a tendency to distort the rectangle, cannot move until that diagonal tying means becomes further stressed to the extent of picking up that percentage of the common loading which the other diagonal tying means was carrying when the structure was static. That is, the structure cannot become distorted until all of the static stress that was in one diagonal migrates to the other diagonal. If the stress in the tie, which is applied by the common loading under static conditions, is as large as, or is larger than, the disturbing force, no movement of the short arm will occur. In that case there will be no lengthening of the total tying means, between the diagonal corners which that total tying means connects.

In the particular application of the invention in which a stop is used for applying force continually to the longer arm of the lever, no movement of a short arm can occur in that direction which would lengthen the diagonal, but the pressure of the longer arm against the stop may be expected to vary with the torque reactions of any machine to which the hub is connected.

The force of the torque reaction is imposed on those parts of the frame which are most able to resist loading without deflecting any member of the frame, i. e., without applying a bending moment to any particular member of the frame. The deforming effect on the aircraft frame as a whole is a minimum, because the restraining forces are applied, in the structure herein illustrated, at points which are remote from the machine, which in this instance is an engine supported at the hub.

In connection with a machine where the stressing of the stabilizing ties might become so high as to move the long arm away from the static position an opposed spring as shown at 40 in Figure 2 may be used in conjunction with the loading spring 38 for the positioning of the long arm when the structure is static.

The loading spring 38 of Figure 2 having been chosen with an appropriate rate of change of tension, the opposed spring 40 may be short and stout and be provided with adjusting means 42 for controlling it so that, when the loading point 34 of the long arm is in the chosen static position, this short stout spring 40 is taut.

Stout spring 40 is stressed only slightly. Then the occurrence of a slight movement of the long arm 26 in the direction of reducing the tension in the loading spring 38, caused by a heavy impulse of torque reaction, would increase the pull of the short stout spring 40 so rapidly as to overcome quickly the force in the loading spring 38. To obtain an intermediate effect the spring used for loading the long arm may be a short stout spring. These various arrangements provide a wide range of options for adapting the apparatus to differing conditions.

Any construction of tie that is suitable may be employed. Figure 3 shows a construction which has particular merit where great strength is desired, coupled with lightness of weight and freedom from vibration in the tie itself. The tie 20' of Figure 3 is a single link formed by winding a ribbon of material, as of steel. This steel may be of such high tensile strength, that it cannot be heated for bending without losing strength, and yet, without heating, cannot be bent around a curve of small radius, unless it is thin. The illustrated construction of link makes treated high tensile steel available. The line 20' is a single length of steel ribbon wound about two arbors 30', 33' set at such a distance from each other as will give to the link its desired length and will provide proper curvature at its ends to fit the pivoting pins which it is to connect. The winding of the ribbon is preferably done under high tension, and in several laminae.

Since the ribbon is wound on itself to make the several laminae, a number of laminae will intervene between the ends of the ribbon. To prevent one end of the ribbon from slipping lengthwise relative to its other end, means is provided to connect those ends across the intervening laminae, shown in Figure 3a, where to each end 45 of the ribbon a boss 46 is added, having an eye at each edge of the ribbon. These eyes are connected by a web 47 which is secured to the end portion 45 of the ribbon, preferably by welding. The ends being at a lengthwise distance apart, on opposite sides of one limb of the link, bolts 48 pass through the eyes of bosses, crossing the group of laminae obliquely at each edge, and so providing a strong lengthwise component to hold the ends of the ribbon against separation.

If optimum strength combined with minimum yield is desired, the tension during the winding process should be such that there is a drawing effect on the metal as it is being wound. This will assure that each ply carries its full share of the load.

By reason of its laminated construction such a link has only a low susceptibility to vibration. If however such a link is to be subjected to disturbing forces which would tend to make it vibrate, the two limbs of the link should be held together at at least one location between the end loops of the link, as by a clamp 44, in Figure 3. This clamping restricts vibrations of those limbs; and the link as a whole is less able to vibrate than if its two limbs were separate.

This type of tie may be used in any of the various structures which embody the invention, in place of the particular variety of tie that may happen to be portrayed in these drawings. The pivots which the loops at the ends of a link fit are such as those at the corners or any other tied regions, and at the pivotal points in the hub of the several figures in the drawing.

It is not necessary that the duplex lever 15 be exactly in the plane of the panel which is being stabilized; nor that the number of duplex levers be as great as the number of panels that are being stabilized. This is illustrated in Figures 4 and 5 where a three-dimensional box frame 50 is stabilized by a single duplex lever 55 and its ties 56. All the ties in Figure 4 receive stress by rotation of the hub 52, as described in Figure 1. Figure 5 shows that in plan view the alignment of each tie 56 with its continuation tie to the diagonally opposite corner is set in a true diagonal alignment. The hub 52 is made wide enough so that when it is rotated to its static position the pivotal points 53 for these ties 56 are on that true diagonal. The movement of the hub in operation will not be sufficient to move them substantially out of straightness in that diagonal.

Figure 6 shows diagrammatically how the invention may be applied to various panels in a helicopter for reducing, in the structure, vibrations emanating from the engine, the large propeller, and the small propeller. Duplex levers 65 and ties 66 operating on the principle illustrated in Figure 1 are placed in different panels of the structure, both lengthwise and crosswise, including one or more of the sections near the tail end of the body. The three-dimensional type of Figure 4 might be substituted for the portrayed use of a duplex lever and ties in each surface panel of the body. Also the plane of application of duplex levers may be inclined (not shown). To avoid confusion of lines, in Figure 6, the duplex levers and their ties are omitted on the remote side and the bottom.

Figure 7 shows how the invention may be embodied in a truss, of any sort, e. g., a bridge truss, for eliminating vibration, and for using the upper stabilizing ties to carry live loading as well as dead loading. Thereby a structure of adequate stability can be made with much less weight than where provision against vibration is made by conventional methods. As a first stage of differentiation from conventional practice, it will be observed that, when this invention is embodied, the various compression elements may be merely pivoted together as at 70, and the elements thus connected do not require to be riveted or welded together with reinforcing plates as is customary. When so pivoted, each element acts as a unit; and it follows that such vibration as may be started in any particular element tends to disappear at the pivot, without its particular type of vibration being transmitted to its joined element. Therefore each particular element may receive its compression load at the middle portion of its end-cross-section where the pivots 70 are, thus avoiding eccentricity of loading, which might result in a vibratory motion in one element generating a bending moment in another element. There is also freedom from the observed tendency of conventional structures to crack near joints where such bending stresses are transmitted from one element to another unless those joints are heavily reinforced.

In the truss portrayed in Figure 7 a pair of channel bars constitute the lower member 71; the inclined ends are rectangular tubes; and channel bars 73 of smaller dimension make the upper compression chord. From the joint pivots 70 at each end of that upper chord, vertical ties 77 descend to the lower member, and, with the upper chord and lower member, constitute a rectangle in the middle part of the structure. Ties 80 extend, one from each corner of this rectangle, to the hub 82 of a duplex lever 85 and a link 87 extends from a mid-location in the hub to the lower member 71 of the truss. Any of these ties may be provided with means for adjusting its length. The pivots 70 in the member 71 should preferably be near the upper flange, so that the tension stress is in the upper part of the channel bar 71, this said upper part being subject to compression when a beam load is carried between any two of those pivots.

A distinctive feature of Figure 7 is that the placing of the hub below the center of the rectangle in which it is set permits of the ties 80, which extend down to the hub from the upper corners of the truss, being made lighter, for the carrying of a given load, as a bridge load, at the center of the span.

The use of a spring 88 to load the lever 85 at the point 84 of the lever's long arm has especial value in a structure of the type of Figure 7. The structure may be designed with willingness for it to yield appreciably under an abnormally heavy load, such as may occasionally pass over a highway bridge. Excessive loading of a mid-portion of the span tends to rotate the lever 85 about its hub 82 elongating the loading spring 88, increasing its tension. Also, the leverage ratio changes, as the hub rotates about its center so that the pivotal points in the hub approach straight alignment between the regions which they connect. Thereby the structure is able to yield slightly in accommodating itself to carrying the heavier load. Thus the loading of the long arm with a spring both produces a high degree of stabilization against vibration within a normal range of operation, and also safeguards the structure against being over-stressed. With such a safeguard against excessive stresses a whole structure may be designed with a smaller factor of safety.

For minimizing the disturbing influence of changing torque reactions of an engine or other machine it is desirable that the region at which those torques are communicated to the supporting structure be as far distant as is practicable from the engine, and from each other. For this purpose it may be useful to support the engine or other machine or other apparatus by suspending means similar to the main cables of a suspension bridge, wholly within the carrying structure. Such a support is illustrated in the left hand portion of Figure 8, where the engine 92 is supported by suspension elements 91 at the front and back of the engine.

From each side of the engine a tie 90 extends downward and outward to a pivotal point 93 in a short arm of the lever that has a fulcrum 100 in the frame of the principal supporting structure, here represented as the bottom member of the frame of an aircraft. Each fulcrum is positioned near vertical struts 94 of the main frame. The long arm 96 of each lever runs from its fulcrum 100 toward the middle of the frame beneath the engine, where the loading points of these two long arms 96 are secured together, by a link 97, and where they are loaded in common by a spring 98 attached to the engine, or to any other anchorage at the mid-region of the frame. Each tie 90 preferably should have a length such that it carries about half of the total common loading applied by the spring 98, when the structure is static. Whenever a torque reaction tends to press down one side of the engine it also tends to lift the other side of the engine; and the stress that was in the tie at that side which is being depressed, migrates to the other side—where it acts to prevent that other side of the engine from rising. That is, the stress that was in one of these ties 90 migrates and increases the stress in the other of them which is on the side that tends to rise.

Thus a partial releasing of stress in one of the ties 90 makes corresponding increase of stress in the other tie 90—for all ratios of change. In result, this migration of loading constitutes an impending force applied directly to the engine for minimizing its oscillations.

At the right in Figure 8 a panel of an aircraft frame is illustrated in which there are two inclined struts 101, 103, pivoted at their upper and lower ends to horizontal members of the frame. The pivoting is not necessary but is a desirable possibility. For stabilizing this panel a duplex lever 105 has a fulcrum 110 in the lower horizontal member of the airplane from near the strut 103. The long arm of the lever extends upward from the hub 112, and is loaded by a spring 108 which is attached to the upper horizontal element of the frame at any convenient point. The hub 112 has a fulcrum 110 and three pivotal points 113, from each of which a tie 120, 122 or 124 extends to one of three separated locations 121, 123 and 125 in the upper horizontal element of the frame. One of these locations 121 is close to the pivot of the upper end of the other strut 101 of the panel, and the other two are at points that are approximately equally spaced between that and the top of the strut 103 whose lower end is in proximity to the fulcrum 110. Since the tie 120 is connected close to the top of the strut, its anchorage is to a more rigid part of the frame than are the anchorages of the other ties 122, 124 from the same lever. It follows that a pre-stressing movement of the lever will put greater stress into this first tie than into the others, they each being attached to a part of the member that can yield somewhat. Therefore the tie 120, under static conditions, carries a larger proportion of the whole pre-loading, and that larger proportion of the loading is available to migrate from it to the other ties 122, 124, when their frame element tends to move in direction to increase the stress on those other ties. Hence the middle part of the upper element at 123, 125 can resist a greater disturbing force, without being deflected upward thereby, than if the preloading were equally distributed among all of the ties. This principle, of arranging one of a plurality of ties with a greater pre-stress than other ties of the same lever, makes possible the designing of structures with a greater range of stability in those portions of the structure which inherently are the more susceptible to movement of a vibratory nature.

This part of Figure 8 also illustrates how a duplex lever may be mounted to permit limited breathing or heaving of an element beyond the normal stabilized range, without danger of collapse of the structure. This is because the loading spring 108 can yield with an increase of loading, as explained with reference to Figure 7. The making of the long arm of the lever so many times longer than the short arms precludes the danger that the lever may vibrate in harmonic sequence with the part which is being restrained. The combining of this feature with pivoted struts, in design of airplane wings, would permit a degree of flexibility in the whole wing structure such as has been heretofore beyond the range of possibility.

Figure 9 shows two duplex levers connected together. The larger of those two levers, herein called the primary lever, has a hub portion 22 with pivotal points 33 therein, from which points stabilizing ties 21 extend, and a long arm 26 for which the stop 29 provides a loading force for tensioning the ties 21—as described with reference to Figure 1. Figure 9 also shows an auxiliary duplex lever 115, fulcrumed at a fixed point 130 in a casing beneath the hub 22 of the primary duplex lever. The hub 122 of this auxiliary lever has two pivotal points 133 from which stabilizing ties 140 extend to points 142 which are beyond the pivotal points 33 at the opposite sides of the center of the hub 22 of the primary lever. The pivotal points 133 are located, relative to their fulcrum 130, so that they are beyond the dead centre line of pull from the fulcrum, yet are so close to that line that they provide effective-work-arms which are short. Under static conditions the stresses in the two ties 140 should be approximately equal. The effect of this is to stabilize the primary duplex lever 15 against quiver oscillations, and even against larger oscillatory tendencies.

This also illustrates the fundamental feature that if the disturbing force caused by a live loading becomes excessive, the loading spring will elongate, thus causing the rotating pivotal points to approach their dead center lines of pull, and thereby decreasing the resultant effective lengths of their short arms—which increases the ratio of the leverage pull by the spring. The simultaneous increases, in the tension of the spring and in the leverage ratio, combine to make rapid increase of resistance to movement of the element to which the tie is applied.

A compact mounting suitable for a duplex lever having a fixed fulcrum to carry heavy loads is shown in Figure 10. The lever 115 is here represented as a channel bar, whose side elevation is seen in Figure 9. Bosses 132, that rise from the base 131 of the mounting, and enclose the side walls of the channel bar, furnish bearings for the fulcrum pin 130 of the lever, and confine the ends of one or more pivotal pins 133 which can be set across the channel, as seen in Figures 9 and 11, in close proximity to the fulcrum pin 130. Within the channel each such pin 133 can hold the loop of a link such as is seen in Figure 3. The fact that the pins 133 do not extend through the bosses 132 leaves adequacy of metal in the boss around the fulcrum pin for the carrying of heavy loads.

Separate pivotal points do not necessarily have separate pivoting pins. Figure 11 shows a mounting 151, similar to that in Figure 10, having a fulcrum 150 for the lever 155, which has a single pivot pin 135 confined between the two side bosses 152 of the mounting, to hold the two separate ties 154, 156. As those ties extend in different directions their bearings are at different locations on the peripheral surface of the pin. In this case the above described increase of leverage ratio, which occurs when a spring 158 becomes elongated by an abnormal disturbing force, cannot be had in the same degree for both ties; but, as the ties are pre-stressed in common, and extend to spaced-apart regions, other advantages of the invention may be had.

For explanation of the relationship between certain forces that inter-act in the structures hereinbefore described, the diagrams, Figures 12, 13, and 14 are helpful.

In the diagram of Figure 12 a duplex lever is indicated by the numeral 15 and this has pivotal points 33 in its hub portion. The stabilizing ties are designated by the letters A, B, C, and D for convenient analytical reference to them.

Assuming that when the long arm of the lever is in the position shown by dotted lines at the left of Figure 12 the ties A, B, C, and D are each just taut, without appreciable stress in them; and that the lines AC and BD comprise straight diagonal lines; then, if the long arm of the lever be depressed from the dotted line position, to the position shown in solid lines, by applying force to that long arm, the out-of-line position of the diagonal lines AC and BD will be as represented in Figure 12. The solid line positions represent all of the ties A, B, C, and D when they are under stress, when the structure which they stabilize is static.

As a first approach in analysing the various forces acting on the hub of the lever, the pivotal point 33 of the tie A may be assumed to be the fulcrum of the lever 15. The magnitude of the reaction of this fulcrum is smaller as the length of the long arm is greater. This follows from the law of the simple lever, which is illustrated in Figure 13. In this the fulcrum of the simple lever is at F; W indicates the weight carried by the short arm of the lever; and P is the force or power applied to the long arm. For example, if W is 20,000 pounds and T is 1,000 pounds, i. e., when the length ratio of the long arm to the short arm is 20, then the fulcrum reaction would be 21,000 pounds. If however the power be applied at P', which is only twice as far from the fulcrum as is the point where the weight W is applied, the assumed weight of 20,000 pounds remaining unchanged, the load needed at P' to balance the weight W would be 10,000 pounds, and the fulcrum reaction would be 30,000 pounds. This increment of 9,000 pounds may be recognized as "useless" fulcrum reaction.

This illustrates why it is desirable to have the fulcrum reaction, at each of the pivotal points 33, as small as is feasible. Consequently the length of the long arm relative to each of the short arms of a duplex lever should be as great as is feasible. Since the duplex lever of Figure 12 has no fixed fulcrum, whatever of fulcrum reaction there is in the hub of that lever must be carried by the totality of ties which support that hub. The main function of such a duplex lever is to stress the various ties A, B, C, and D; therefore, the magnitude of the force applied by each short arm to stress its respective tie should be large relative to the loading force which is applied to the long arm of the lever. This eliminates "useless" fulcrum reactions. Therefore, to provide this force advantageously, the length of the long arm of the lever should be many times the length of the effective short arms in the hub of that lever.

In Figure 12, continuations of the lines of the ties A and B are projected in dotted lines to locations beyond the pivotal point 33 of the ties C and D respectively. Since the effective arm of a lever is the distance from its fulcrum to the line of applied force, measured on a line perpendicular to said line of force, it follows that the perpendicular distance from the projected line of the tie A to the pivotal point of the tie C may be considered to be the effective short arm of the lever 15 which stresses the ties A and C in that diagonal tying means. Alternatively, the perpendicular distance from the projected line of the tie C to the pivotal point of the tie A may be considered to be the effective short arm of the lever 15 which stresses the ties A and C in that diagonal tying means; or it may be considered that the short arm is the perpendicular distance to some other pivotal point. In all cases the longer arm is so greatly longer than any of the short arms that any differences in effective lengths of short arms will be inconsequential. The long arm of the lever is the distance from the pivotal point 33 of the tie A to the stop 29 at the outer end of the lever 15. Likewise the perpendicular distance from the projected line of the tie B to the pivotal point 33 of the tie D may be considered to be the effective short arm for stressing that diagonal; and the long arm may be considered to be the distance from the pivotal point 33 of the ties D to the stop 29 at the outer end of the lever 15.

Figure 12 is a diagrammatic representation of the arrangement of ties shown in Figure 1.

From another analytical standpoint the upper ties A and B may be assumed to carry a load at the hub, which load is yieldably supported at the pivotal points 33 of these two ties A and B; and this hub is stabilized by the ties C and D.

A simple illustration of this relationship is shown in Figure 14, which may be considered as a diagrammatic representation of the left hand portion of Figure 8, where leverage means applies the tensioning pull to two ties H and I at their lower ends, instead of tensioning the ties C and D at their upper ends, as in Figure 12. In Figure 14 the only special requirement for supporting an engine or other load is that the supporting element 91 be yieldable at the points M and N where the stabilizing ties H and I are respectively connected thereto. The pivotal points 93 at the lower ends of the ties H and I are in separate levers whose fulcrums are held in the carrying structure at locations which are farther from each other than are the upper ends of the ties H and I, at M and N; the long arms 96 extend inward from these fulcrums to a mid-location between them, where these long arms are linked together, and a continual loading force is applied to them in common, by a spring 98. When the structure is static the tension in the ties H and I should be approximately equal. Then, when a disturbing force tends to cause the region M to rise, the tie H will become subjected to a larger percentage of the said common loading than it carried when the structure was static; and, if the region N tends to rise, a percentage of the common loading migrates to the tie I to restrict rise at N. If the element 91 supports an engine, and the operating of the engine causes variations in torque which tend to oscillate that engine, then there might be a downward pressure at M, and a tendency to lift at N; and on the return beat of the oscillation the downward pressure would be at N, and the tendency to rise at M. In either case, common loading is available to migrate to either M or N to restrain rising movements there.

From yet another analytical standpoint the mere pre-loading of the stabilizing ties which initially imposes elastic deflection at both M and N, may be an important factor in the total stabilizing restraints provided by this invention. In addition to the restricting of undulating movements by migration of loading to either M or N, as noted above, an oscillation of the engine tends to move one of these points downward while the other of them tends to rise, and this tendency to downward movement is restricted by the resilience of the element 91. This follows because the elastic deflection of the carrying element 91 was imposed at both M and N by the loading applied to the ties H and I when the structure was static. Referring now to only one beat of an oscillation when the tendency is to depress N the resilience of the element 91 can resist downward movement there, because the loading which applied the elastic deflection at N migrates and restricts upward movement at M, thus releasing resilient upward push at N equivalent to the force which was imposed at N to produce elastic deflection there when the structure was static. On the next beat of the oscillation this sequence of forces is reversed relative to the points M and N.

In the above analyses of the physical forces acting to restrict undulatory movements of a resilient structure no allowance is made for the fact that the stabilizing ties are themselves elastic and resilient. This cannot affect the general aspect of the forces described, although it may cause a slight time lag in the initiation and in the ultimate application of those forces.

The structure of this invention, it is believed, utilizes this slight lag for eliminating harmonic sequences of movements in remote parts of the structure which is being stabilized.

I claim as my invention:

1. Means for minimizing vibratory movements in a structure which is for carrying a machine, the operating of which machine produces forces that tend to cause disturbing movements, comprising in combination, a duplex lever having a long arm and a hub portion; stabilizing ties, at least four in number, each pivotally connected to a point in said hub portion and extending from its said pivotal point to a region of the carrying structure which if not restrained would yield to said disturbing forces, and being connected there to said structure; two of said stabilizing ties being inclined outward and upward from said hub, and two of them being inclined outward and downward from that hub; said hub being fastened to said machine for preventing rotation of that machine relative to said hub; and means for continually applying force to the said long arm for providing a loading which tends to rotate said hub portion and which said loading is common to, and stresses each of said stabilizing ties, severally, when the structure is static, whereby, when the structure is disturbed so that a said yieldable region tends to increase the stress in its respective tie, that tie becomes subjected to a larger percentage of the said common loading than it carried when the structure was static.

2. Means for minimizing vibratory movements as in claim 1, further characterized in that there is a said duplex lever at each of the opposite ends of the said machine, the hub of each said lever being fastened to that machine as in said claim.

3. Means for minimizing vibratory movements as in claim 1, further characterized in that the said means for continually applying force to the said long arm is a spring.

4. Means for minimizing vibratory movements in a structure which has a panel that disturbing forces tend to distort, comprising in combination, a bar lever means having a long arm and a hub portion; stabilizing ties, at least four in number, each pivotally connected to a point in said hub portion and extending from its said pivotal point to a region of the said panel which if not restrained would yield to said disturbing forces, that tie being there connected to said structure; said hub being located in a mid-portion of said panel with two of said ties being inclined outward and upward from that hub, and two of said ties being inclined outward and downward from that hub; and means for continually applying force to the said long arm for providing a loading which tends to rotate said hub portion and which said loading is common to and stresses each of said stabilizing ties, severally, when the structure is static, whereby, when a disturbing force tends to distort said panel so that a said yieldable region increases the stress in its respective tie, that tie becomes subjected to a larger percentage of the said common loading than it carried when the structure was static.

5. Means for minimizing vibratory movements as in claim 4, further characterized in that the said means for continually applying force to the said long arm is a spring.

6. Means for minimizing vibratory movements in a structure which is for carrying a machine, the operating of which machine tends to produce disturbing movements, comprising in combination, means for partially sustaining said machine at each of two regions which are spaced apart from each other and are yieldable upward and downward; a stabilizing tying means for each of said regions, inclined downward and outward from the other of said regions and having anchorage in said structure; bar leverage means having at least two short arms and having longer arm means; each said tying means having a said short arm connected into, and constituting a part of, that respective tying means; and means, other than the said stabilizing tying means for continually applying force to said longer arm means for producing a loading which is common to, and which stresses each of, said tying means, when the structure is static; whereby, when the structure is disturbed so that a said tied region tends to move upward from its static position its respective tying means becomes subjected to a larger percentage of the said common loading than that which that tying means carried when the structure was static.

7. Means for minimizing vibratory movements as in claim 6, further characterized in that the said means for continually applying force to said longer arm means is a spring.

8. Means for minimizing vibratory movements as in claim 6, further characterized in that the said leverage means comprises two levers each having a short arm and a longer arm; the fulcrum points of these levers being held in said structure and being at a distance apart greater than is the distance between the two said yieldable regions; each stabilizing tying means being connected to the short arm of its respective lever; and the longer arm of each lever extends inward to a mid-location between said fulcrums, and the two longer arms are there linked together and the said common loading for the two short arms is there applied.

9. Means for minimizing vibratory movements in a load-carrying resilient structure having spaced apart regions which tend to approach each other and to recede from each other when the structure is subjected to disturbing forces, comprising in combination at least two stabilizing tying means each extending between two of said regions, the directions of said tying means being oblique to each other; bar leverage means having at least two short arms and having longer arm means; each said tying means having one of said short arms connected into it and constituting a part of itself; and means, other than the said stabilizing tying means, for continually applying force to said longer arm means for providing a loading which is common to said tying means and stresses each of said tying means when the structure is static; whereby when the structure is disturbed so that two of said tied regions which a said tying means ties together tend to recede from each other the tying means between those regions becomes subjected to a larger percentage of the said common loading than it carried when the structure was static.

MERL R. WOLFARD.

REFERENCES CITED

The following references are of record in the file of this patent:

UNITED STATES PATENTS

| Number | Name | Date |
|---|---|---|
| 118,293 | Stephens | Aug. 22, 1871 |
| 600,401 | Brisbin | Mar. 8, 1898 |
| 850,612 | Beltzer | Apr. 16, 1907 |
| 867,749 | Noyes | Oct. 8, 1907 |
| 1,371,457 | Weiss | Mar. 15, 1921 |
| 1,392,529 | Schussler | Oct. 4, 1921 |
| 1,762,845 | Upson | June 10, 1930 |
| 1,770,845 | Crosthwait | July 15, 1930 |
| 1,903,725 | Sweeney | Apr. 11, 1933 |
| 1,995,248 | Herman | Mar. 19, 1935 |
| 2,053,226 | Ruge | Sept. 1, 1936 |
| 2,060,859 | Flynt | Nov. 17, 1936 |